US012763717B2

(12) United States Patent
Sun et al.

(10) Patent No.: US 12,763,717 B2
(45) Date of Patent: Oct. 13, 2026

(54) PHOTOVOLTAIC TRACKING METHOD AND APPARATUS, ELECTRONIC DEVICE, AND NON-TRANSITORY STORAGE MEDIUM

(71) Applicant: TRINA SOLAR CO., LTD, Changzhou (CN)

(72) Inventors: Kai Sun, Changzhou (CN); Guokun Huang, Changzhou (CN); Peng Quan, Changzhou (CN); Ming Zhao, Changzhou (CN)

(73) Assignee: TRINA SOLAR CO., LTD, Changzhou (CN)

( * ) Notice: Subject to any disclaimer, the term of this patent is extended or adjusted under 35 U.S.C. 154(b) by 443 days.

(21) Appl. No.: 18/289,046

(22) PCT Filed: Sep. 1, 2021

(86) PCT No.: PCT/CN2021/115916
§ 371 (c)(1),
(2) Date: Oct. 31, 2023

(87) PCT Pub. No.: WO2023/284080
PCT Pub. Date: Jan. 19, 2023

(65) Prior Publication Data

US 2024/0235461 A1 Jul. 11, 2024

(30) Foreign Application Priority Data

Jul. 14, 2021 (CN) ......................... 202110793503.9

(51) Int. Cl.
*H02S 20/32* (2014.01)
*G01S 3/786* (2006.01)
*G01W 1/10* (2006.01)

(52) U.S. Cl.
CPC ............ *H02S 20/32* (2014.12); *G01S 3/7861* (2013.01); *G01W 1/10* (2013.01); *G01W 2203/00* (2013.01)

(58) Field of Classification Search
CPC ... G01W 1/10; G01W 2203/00; G01S 3/7861; H02S 20/32; H02S 40/30; H02S 50/00; Y02E 10/50; G05D 3/12
(Continued)

(56) References Cited

U.S. PATENT DOCUMENTS

| | | | |
|---|---|---|---|
| 10,935,992 | B1 | 3/2021 | Morse et al. |
| 2007/0084502 | A1 | 4/2007 | Kelly et al. |

(Continued)

FOREIGN PATENT DOCUMENTS

| | | | |
|---|---|---|---|
| CN | 105958930 | A | 9/2016 |
| CN | 108347221 | A | 7/2018 |

(Continued)

OTHER PUBLICATIONS

Australian Patent Office, Examination Report No. 1 issued in corresponding Application No. 2021455921, dated May 20, 2024, 6 pp.

(Continued)

*Primary Examiner* — Chun Cao
(74) *Attorney, Agent, or Firm* — Taft, Stettinius & Hollister LLP

(57) ABSTRACT

A tracking method and apparatus, an electronic device, and a storage medium. The tracking method comprises: in a solar tracking phase, determining a current weather type according to current weather data and/or current power generation of components on at least two photovoltaic tracking brackets (S110); and determining first target tracking angles of the components according to the current weather type, so that a tracking controller corresponding to the components adjusts
(Continued)

the corresponding photovoltaic tracking brackets according to the first target tracking angles, so as to adjust the components on the photovoltaic tracking brackets (S120).

12 Claims, 6 Drawing Sheets

(58) Field of Classification Search
USPC ........................................................... 700/275
See application file for complete search history.

(56) References Cited

U.S. PATENT DOCUMENTS

| | | | | |
|---|---|---|---|---|
| 2015/0162868 | A1 | 6/2015 | Lee | |
| 2016/0308488 | A1* | 10/2016 | Liu | H02S 20/32 |
| 2017/0070187 | A1* | 3/2017 | Jain | F24S 50/20 |
| 2021/0141047 | A1* | 5/2021 | Ma | F24S 50/20 |
| 2021/0341951 | A1* | 11/2021 | Ma | G05D 3/105 |
| 2022/0329200 | A1* | 10/2022 | Duan | F24S 30/425 |
| 2024/0231397 | A1* | 7/2024 | Ma | H02S 10/00 |

FOREIGN PATENT DOCUMENTS

| | | | | |
|---|---|---|---|---|
| CN | 108923738 | A | 11/2018 | |
| CN | 110658858 | A | 1/2020 | |
| CN | 111399548 | A | 7/2020 | |
| CN | 112166554 | A | 1/2021 | |
| CN | 113110617 | A | 7/2021 | |
| CN | 113126660 | A * | 7/2021 | G05D 3/12 |
| JP | 2015138912 | A | 7/2015 | |
| WO | 2019010387 | A1 | 1/2019 | |
| WO | 2020047167 | A1 | 3/2020 | |

OTHER PUBLICATIONS

International Search Report for corresponding Application No. PCT/CN2021/115916 dated Apr. 13, 2022, 4 pages.
Written Opinion for corresponding Application No. PCT/CN2021/115916 dated Apr. 13, 2022, 3 pages.
Chinese Patent Office, First Office Action issued in corresponding Application No. 202110793503.9, dated Apr. 30, 2025, 16 pp.
European Patent Office, Extended Search Report issued in corresponding Application No. 21949855.7, dated Jun. 23, 2025, 7 pp.
China Patent Office, Second Office Action issued in corresponding Application No. 202110793503.9, dated Mar. 1, 2026.

* cited by examiner

PHOTOVOLTAIC TRACKING METHOD AND APPARATUS, ELECTRONIC DEVICE, AND NON-TRANSITORY STORAGE MEDIUM

CROSS REFERENCE TO RELATED APPLICATIONS

This is a U.S. National Stage application of, and claims priority to, PCT/CN2022/080260, filed Mar. 11, 2022, which further claims priority to Chinese Patent Application No. 202110682417.0, filed Jun. 18, 2021, the disclosures of which are incorporated herein by reference in their entirety.

TECHNICAL FIELD

The present disclosure relates to the field of photovoltaic tracking technologies, for example, a tracking method and apparatus, an electronic device, and a storage medium.

BACKGROUND

A tracking algorithm of a photovoltaic tracker is mainly based on an astronomical algorithm, in which an angle of the tracker is adjusted to cause a module to be perpendicular to direct solar irradiance. Although the astronomical algorithm is relatively mature and simple, there are still some obvious deficiencies. The astronomical algorithm is only suitable for sunny days, which can only ensure that the module receives maximum direct irradiance, does not consider an influence of diffuse irradiance, and is not suitable for weather such as windy, snowy, and rainy days.

SUMMARY

The present disclosure provides a tracking method and apparatus, an electronic device, and a storage medium, so as to realize intelligentization of photovoltaic tracking.

In a first aspect, embodiments of the present disclosure provide a tracking method, including:

- in an astronomical tracking phase, determining a current weather type according to current weather data and/or current power generation of modules on at least two photovoltaic trackers;
- determining first target tracking angles of the modules according to the current weather type, so that a tracking controller corresponding to the modules adjusts the corresponding photovoltaic trackers according to the first target tracking angles, so as to adjust the modules on the photovoltaic trackers.

In a second aspect, the embodiments of the present disclosure further provide a tracking apparatus, including:

- a weather type determination device configured to, in an astronomical tracking phase, determine a current weather type according to current weather data and/or current power generation of modules on at least two photovoltaic trackers;
- a first tracking angle determination device configured to determine first target tracking angles of the modules according to the current weather type, so that a tracking controller corresponding to the modules adjusts the corresponding photovoltaic trackers according to the first target tracking angles, so as to adjust the modules on the photovoltaic trackers.

In a third aspect, the embodiments of the present disclosure further provide an electronic device, including:

- one or more processors;
- a memory configured to store one or more programs;
- wherein, when the one or more programs are executed by the one or more processors, the one or more processors are caused to implement the tracking method according to any one of the embodiments of the present disclosure.

In a fourth aspect, the embodiments of the present disclosure further provide a computer-readable storage medium storing a computer program, wherein, when the computer program is executed by a processor, the tracking method according to any one of the embodiments of the present disclosure is implemented.

DETAILED DESCRIPTION OF THE EMBODIMENTS

The present disclosure is described below with reference to the accompanying drawings and embodiments. The embodiments described herein are intended only to explain the present disclosure, but not to limit the present disclosure. For ease of description, only some structures but not all structures related to the present disclosure are shown in the accompanying drawings.

Embodiment 1

Figure 1A:
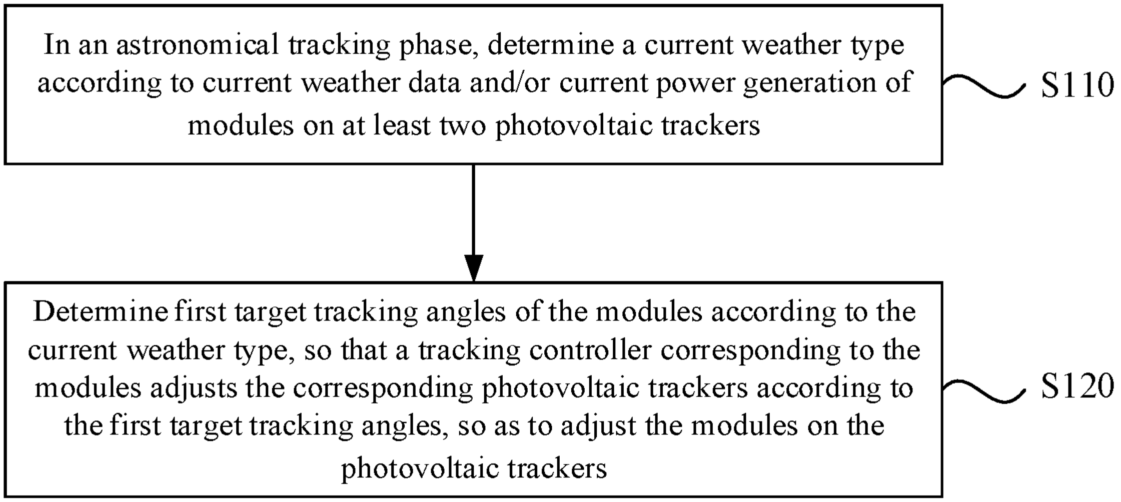
FIG. 1A is a flowchart of a tracking method according to Embodiment 1 of the present disclosure.

FIG. 1A is a flowchart of a tracking method according to Embodiment 1 of the present disclosure. This embodiment is applicable to a situation where a tracking angle of a photovoltaic tracker is adjusted. The method is performed by a tracking apparatus. The apparatus may be implemented by software and/or hardware, and may be integrated into an electronic device carrying a tracking function, such as a server.

As shown in FIG. 1A, the method may include the following steps.

In S110, in an astronomical tracking phase, a current weather type is determined according to current weather data and/or current power generation of modules on at least two photovoltaic trackers.

The so-called "astronomical tracking phase" refers to a period of time during which a photovoltaic tracker rotates with the sun and a module on the photovoltaic tracker faces the sun. The module may be a photovoltaic module. The so-called "photovoltaic tracker" refers to a tracker provided with a tracking controller, which is a tracker configured to support the module to rotate with movement of the sun. The tracking controller is configured to adjust rotation of the module. The photovoltaic tracker is composed of one or more vertical columns and a horizontal bar, and one or more modules are arranged on the horizontal bar. The photovoltaic tracker may be a "T"-shaped tracker. Optionally, a direction where two endpoints on the photovoltaic tracker are located is a horizontal direction.

The current weather data refers to weather data in a scene where the photovoltaic tracker is located, including, but not limited to, global horizontal irradiance, direct horizontal irradiance, diffuse horizontal irradiance, air quality data, air humidity, a wind direction, wind speed, and the like. The weather type may include Windy, Snowy, Cloudy, Sunny, Overcast, and Rainy.

The current weather data may be inputted into a pre-trained first neural network model, and the first neural network model outputs the current weather type. The first neural network model is obtained by training according to historical weather data and historical weather types.

Alternatively, the current weather data and the current power generation of the modules on the at least two photovoltaic trackers may be inputted into a pre-trained second neural network model, and the second neural network model outputs the current weather type. The second neural network model is obtained by training according to historical weather data, historical power generation of the modules on the at least two photovoltaic trackers, and historical weather types.

Optionally, the determining the current weather type according to the current power generation of the modules may be: determining the current weather type according to the current power generation, a current solar altitude angle, and a dividing line between various weather types; wherein the dividing line between various weather types is determined according to a relationship among historical power generation, solar altitude angles, and historical weather data.

Figure 1B:
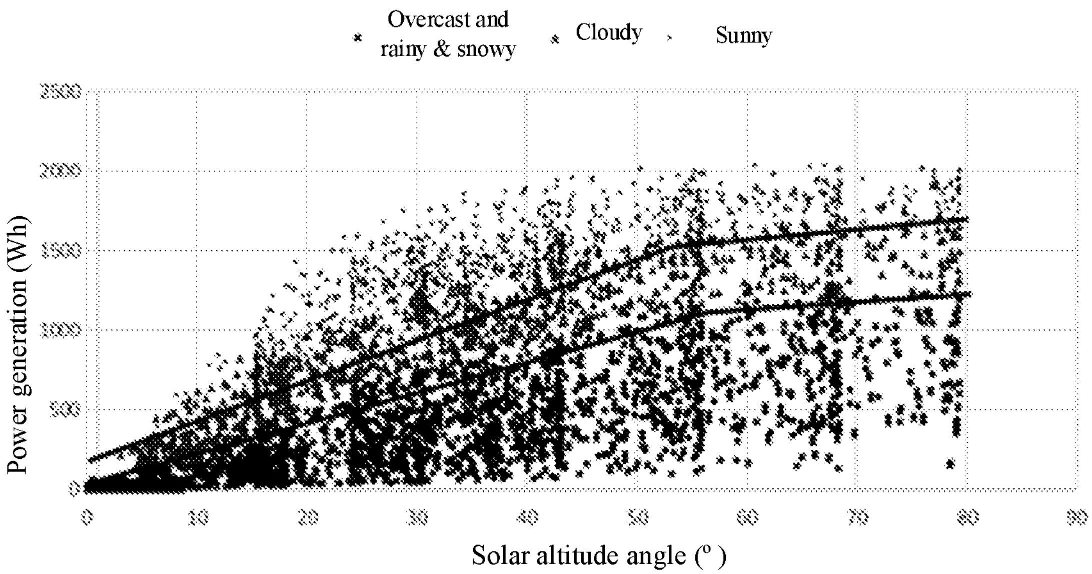
FIG. 1B is a scatter diagram of variations of power generation with solar altitude angles under different weather types according to Embodiment 1 of the present disclosure.

A scatter diagram may be drawn based on hourly historical power generation of the module on one photovoltaic tracker in a year, solar altitude angles, and historical weather types. From the scatter diagram, it can be seen that distribution regions of the historical power generation and the solar altitude angles corresponding to different weather types are different. A dividing line function of different weather types is fit through the scatter diagram. The dividing line function may be a piecewise function. Then, the current power generation and a current solar altitude angle are inputted into the piecewise function to obtain the corresponding current weather type. For example, FIG. 1B is a scatter diagram of variations of power generation with solar altitude angles under different weather types in a region.

The determining the current weather type according to the current weather data of the modules may include: determining the current weather type according to current global horizontal irradiance, a current solar altitude angle, and a dividing line between various weather types; wherein the dividing line between various weather types is determined according to a relationship among historical global horizontal irradiance, solar altitude angles, and historical weather data.

Figure 1C:
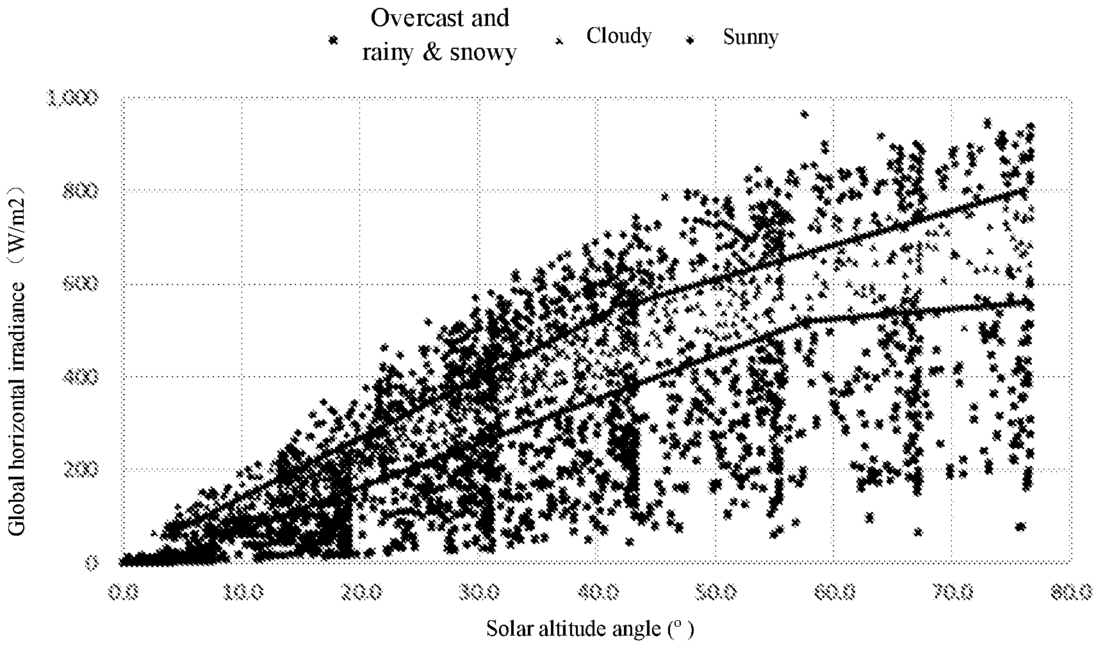
FIG. 1C is a scatter diagram of variations of global horizontal irradiance with solar altitude angles under different weather types according to Embodiment 1 of the present disclosure.

A scatter diagram may be drawn based on hourly historical power generation of the module on one photovoltaic tracker in a year, global horizontal irradiance, and historical weather types. From the scatter diagram, it can be seen that distribution regions of the historical power generation and the global horizontal irradiance corresponding to different weather types are different. A dividing line function of different weather types is fit through the scatter diagram. The dividing line function may be a piecewise function. Then, current global horizontal irradiance and a current solar altitude angle are inputted into the piecewise function to obtain the current weather type. For example, FIG. 1C is a scatter diagram of variations of global horizontal irradiance with solar altitude angles under different weather types in a region.

In S120, first target tracking angles of the modules are determined according to the current weather type, so that a tracking controller corresponding to the modules adjusts the corresponding photovoltaic trackers according to the first target tracking angles, so as to adjust the modules on the photovoltaic trackers.

The first target tracking angle refers to a corresponding tracking angle in the astronomical tracking phase when overall power generation of the module on the photovoltaic tracker is optimal under the current weather type of a region where the photovoltaic tracker is located.

In this embodiment, exemplarily, if the current weather type is Windy, the first target tracking angle of the module is set to a first fixed angle or a first preset angle range. Both the first fixed angle and the first preset angle range may be flexibly determined according to an actual situation. Then, the tracking controller corresponding to the module adjusts the corresponding photovoltaic tracker according to the first target tracking angle, so as to adjust the module on the photovoltaic tracker.

Exemplarily, if the current weather type is Snowy, the first target tracking angle of the module is set to a second fixed angle or a second preset angle range. Both the second fixed angle and the second preset angle range may be flexibly determined according to an actual situation. The second preset angle range may overlap with the first preset angle range. Then, the tracking controller corresponding to the module adjusts the corresponding photovoltaic tracker according to the first target tracking angle, so as to adjust the module on the photovoltaic tracker.

Exemplarily, if the current weather type is Cloudy, the first target tracking angle of the module is set to an angle that is a set value smaller than an astronomical angle. The astronomical angle is determined according to an astronomical algorithm, and the set value may be set according to an actual situation. If the current weather type is Cloudy and a cloud cover fluctuates violently in cloudy days, the first target tracking angle of the module is set to the astronomical angle. Then, the tracking controller corresponding to the module adjusts the corresponding photovoltaic tracker according to the first target tracking angle, so as to adjust the module on the photovoltaic tracker.

Exemplarily, if the current weather type is Sunny, the first target tracking angle of the module is set to the astronomical angle. The astronomical angle is determined according to the astronomical algorithm. Then, the tracking controller corresponding to the module adjusts the corresponding photovoltaic tracker according to the first target tracking angle, so as to adjust the module on the photovoltaic tracker.

Exemplarily, if the current weather type is Overcast, the first target tracking angle of the module is set to a third fixed angle. The third fixed angle may be flexibly determined according to an actual situation. Then, the tracking controller corresponding to the module adjusts the corresponding photovoltaic tracker according to the first target tracking angle, so as to adjust the module on the photovoltaic tracker.

Exemplarily, if the current weather type is Rainy, the first target tracking angle of the module is set to a fourth fixed angle. In consideration of accumulation of dust on a tracker module, a timing mechanism may be set for Rainy, and according to objective factors such as air quality and a dust accumulation degree of a project, the first target tracking angle of the module is set to a third preset angle range. The third preset angle range may be flexibly determined according to an actual situation. Then, the tracking controller corresponding to the module adjusts the corresponding photovoltaic tracker according to the first target tracking angle, so as to adjust the module on the photovoltaic tracker.

The first fixed angle, the second fixed angle, the third fixed angle, and the fourth fixed angle may be the same or different, and may be flexibly determined according to a scene where the photovoltaic tracker is located and a type of the photovoltaic tracker. Similarly, the first preset angle range, the second preset angle range, and the third preset angle range may overlap or not overlap, and may also be flexibly determined according to a scene where the photovoltaic tracker is located and a type of the photovoltaic tracker.

According to the technical solution in the embodiments of the present disclosure, in the astronomical tracking phase, the current weather type is determined according to the current weather data and/or the current power generation of the modules on the at least two photovoltaic trackers, and then the first target tracking angles of the modules are determined according to the current weather type, so that the tracking controller corresponding to the modules adjusts the corresponding photovoltaic trackers according to the first target tracking angles, so as to adjust the modules on the photovoltaic trackers. According to the above technical solution, identification accuracy of different weather types is improved, and the tracking angles of the photovoltaic trackers under different weather types are flexibly adjusted, thereby increasing power generation of the modules on the photovoltaic trackers and providing a new idea for intelligent photovoltaic tracking.

Embodiment 2

Figure 2:
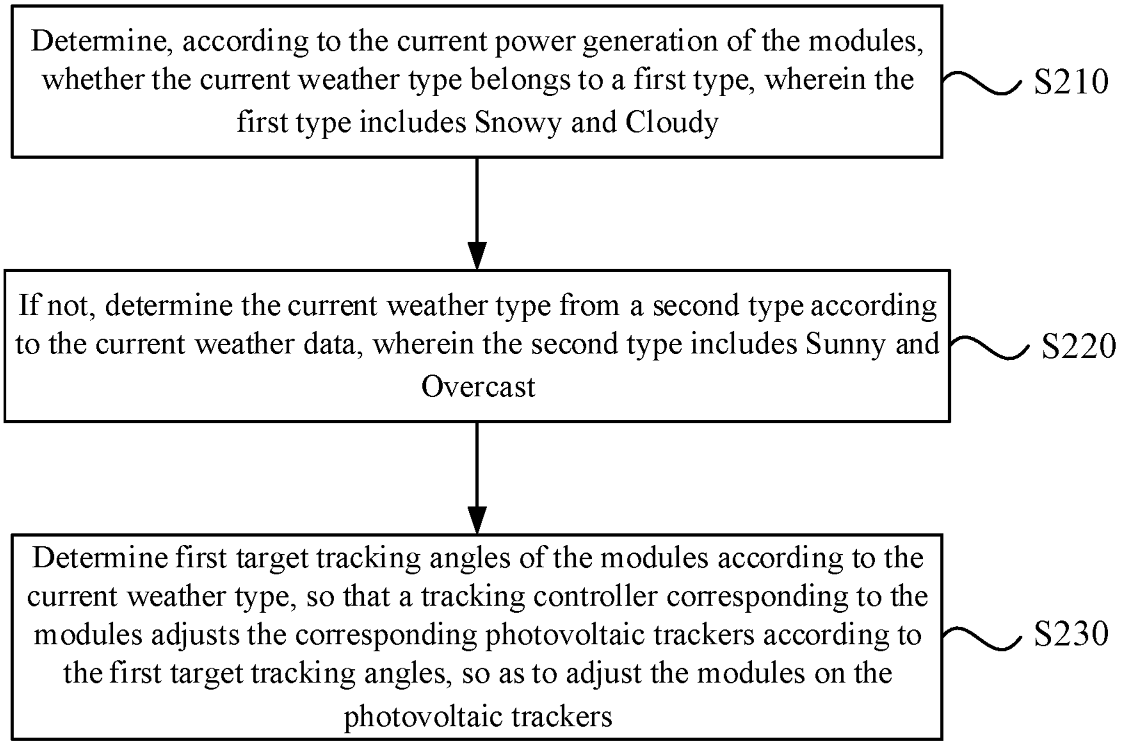
FIG. 2 is a flowchart of a tracking method according to Embodiment 2 of the present disclosure.

FIG. 2 is a flowchart of a tracking method according to Embodiment 2 of the present disclosure. On the basis of the above embodiment, "in an astronomical tracking phase, determining a current weather type according to current weather data and/or current power generation of modules on at least two photovoltaic trackers" is described, and an optional implementation solution is provided.

As shown in FIG. 2, the method may include the following steps.

In S210, whether the current weather type belongs to a first type is determined according to the current power generation of the modules, wherein the first type includes Snowy and Cloudy.

In this embodiment, optionally, before it is determined, according to the current power generation of the modules, whether the current weather type belongs to the first type, it may be determined, according to wind speed data in the current weather data, whether current weather is Windy. The wind speed data may be measured by an anemometer. If a wind speed value is greater than a set wind speed threshold, it is determined that the current weather type is Windy. The set wind speed threshold may be set according to an actual situation.

Optionally, if the current weather type is not Windy, the determining, according to the current power generation of the modules, whether the current weather type belongs to the first type may be: determining a power generation dispersion ratio according to the current power generation of the modules; determining that the current weather type is Snowy in the first type if the power generation dispersion ratio is equal to or greater than a first dispersion threshold; and determining that the current weather type is Cloudy in the first type if the power generation dispersion ratio is equal to or greater than a second dispersion threshold and a difference between cumulative power generation and reference power generation of the modules within a set time period is equal to or greater than a fluctuation threshold.

The first dispersion threshold and the second dispersion threshold may be flexibly set according to an actual situation. The first dispersion threshold and the second dispersion threshold may alternatively be determined according to historical power generation of the modules and historical weather data. The first dispersion threshold and the second dispersion threshold may be the same or different. The fluctuation threshold may be set according to an actual situation. The so-called "cumulative power generation" refers to cumulative power generation of the modules within a set period of time. The reference power generation refers to cumulative power generation of the modules within a set period of time on the assumption that the weather type is Sunny. The set period of time may be set according to an actual situation.

A quotient of a standard deviation and an average value of the current power generation of the modules on a plurality of photovoltaic trackers may be calculated, and the quotient may be used as the power generation dispersion ratio. The current weather type is Snowy in the first type if the power generation dispersion ratio is equal to or greater than the first dispersion threshold. It is determined that the current weather type is Cloudy in the first type if the power generation dispersion ratio is equal to or greater than the second dispersion threshold and the difference between the cumulative power generation and the reference power generation of the modules within the set time period is equal to or greater than the fluctuation threshold.

In S220, the current weather type is determined from a second type according to the current weather data in a case that the current weather type does not belong to the first type, wherein the second type includes Sunny and Overcast.

In this embodiment, if the current weather type does not belong to the first type, the determining the current weather type from the second type according to the current weather data may be: determining a proportion of direct irradiance according to the current weather data; determining that the current weather type is Sunny in the second type if the proportion of direct irradiance is equal to or greater than a first threshold; and determining that the current weather type is Overcast in the second type if the proportion of direct irradiance is less than or equal to a second threshold, wherein the first threshold is greater than the second threshold. If the proportion of direct irradiance is greater than the second threshold and less than the first threshold, it is determined that the current weather type may be Cloudy in the first type, and the method goes back to S210. That is, the current weather type is determined according to the current power generation of the modules.

The first threshold and the second threshold may be set according to an actual situation, or determined according to historical weather data and historical weather type.

A quotient of direct horizontal irradiance and global horizontal irradiance in the current weather data may be calculated, and the quotient may be used as the proportion of direct irradiance. It is determined that the current weather type is Sunny in the second type if the proportion of direct irradiance is equal to or greater than the first threshold. It is determined that the current weather type is Overcast in the second type if the proportion of direct irradiance is less than or equal to the second threshold.

If the current weather type is not Overcast, whether the current weather type is Rainy is determined according to weather data. If current rainfall data reaches a set rainfall threshold, it is determined that the current weather type is Rainy. The current rainfall data may be measured by a rain gauge. The set rainfall threshold may be set according to an actual situation.

In S230, first target tracking angles of the modules are determined according to the current weather type, so that a tracking controller corresponding to the modules adjusts the corresponding photovoltaic trackers according to the first target tracking angles, so as to adjust the modules on the photovoltaic trackers.

According to the technical solution in the embodiments of the present disclosure, whether the current weather type belongs to the first type is determined according to the current power generation of the modules. If not, the current weather type is determined from the second type. Then, the first target tracking angles of the modules are determined according to the current weather type, so that the tracking controller corresponding to the modules adjusts the corresponding photovoltaic trackers according to the first target tracking angles, so as to adjust the modules on the photovoltaic trackers. According to the above technical solution, the current weather type can be more flexibly and accurately determined, thereby improving accuracy of the tracking angles of the modules and increasing power generation of the modules.

Embodiment 3

Figure 3A:
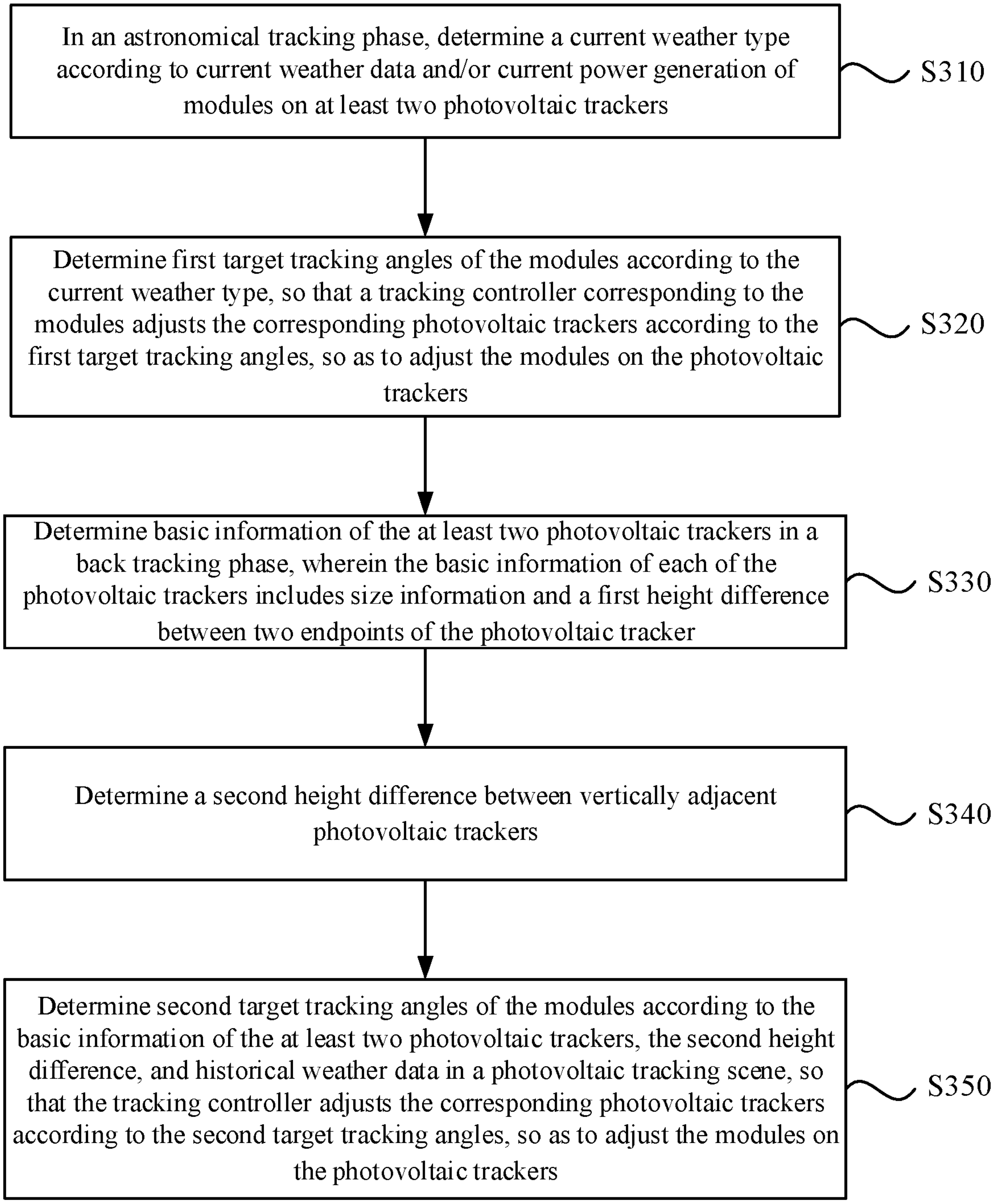
FIG. 3A is a flowchart of a tracking method according to Embodiment 3 of the present disclosure.

FIG. 3A is a flowchart of a tracking method according to Embodiment 3 of the present disclosure. Description is provided on the basis of the above embodiment, and an optional implementation solution is provided.

As shown in FIG. 3A, the method may include the following steps.

In S310, in an astronomical tracking phase, a current weather type is determined according to current weather data and/or current power generation of modules on at least two photovoltaic trackers.

In S320, first target tracking angles of the modules are determined according to the current weather type, so that a tracking controller corresponding to the modules adjusts the corresponding photovoltaic trackers according to the first target tracking angles, so as to adjust the modules on the photovoltaic trackers.

In S330, basic information of the at least two photovoltaic trackers is determined in a back tracking phase, wherein the basic information of each of the photovoltaic trackers includes size information and a first height difference between two endpoints of the photovoltaic tracker.

The size information refers to a width and a length of the module on the photovoltaic tracker. The first height difference refers to a horizontal height difference between two endpoints of the photovoltaic tracker caused by uneven terrain.

The so-called "back tracking phase" refers to early morning or evening, during which a solar altitude angle is relatively low. In this case, if the tracking controller on the photovoltaic tracker drives the photovoltaic tracker to track sunlight according to an optimal solar radiation angle, the module on the photovoltaic tracker may be covered by shadows due to shading. Due to a series effect of the modules, as long as one module in the photovoltaic tracker is shaded, no matter how strong the sunlight is, power generation currents of other modules on the photovoltaic tracker may be reduced to an extremely low level. Therefore, when the above situation occurs, tracking cannot be performed with the optimal radiation angle, but the photovoltaic tracker can track the sunlight with a tracking method of considering daylighting without shading. Since a movement direction of the tracker in this tracking algorithm is opposite to a direction of the sun, it is called back tracking.

In this embodiment, the basic information of the at least two photovoltaic trackers may be determined by a measurement tool. The measurement tool may be a total station, a theodolite, a level gauge, or the like.

In S340, a second height difference between vertically adjacent photovoltaic trackers is determined.

The second height difference between the vertically adjacent photovoltaic trackers refers to a horizontal height difference between front and rear adjacent rows of photovoltaic trackers caused by uneven terrain in a direction perpendicular to the photovoltaic tracker (i.e., a direction perpendicular to a horizontal direction).

The second height difference between the vertically adjacent photovoltaic trackers may be determined by a measurement tool. The measurement tool may be a total station, a theodolite, a level gauge, or the like.

It requires a lot of labor costs to measure the second height difference between the vertically adjacent photovoltaic trackers by using the measurement tool. Therefore, in order to save the labor costs, as an optional manner of this embodiment, the determining the second height difference between the vertically adjacent photovoltaic trackers may be: determining, when the modules on the vertically adjacent photovoltaic trackers are in an unshaded state, the second height difference between the vertically adjacent photovoltaic trackers according to solar incidence angles, a current tracking angle and a module width of each of the vertically adjacent photovoltaic trackers, and a distance between the vertically adjacent photovoltaic trackers.

The current tracking angle refers to a tracking angle of the photovoltaic tracker when the modules on the vertically adjacent photovoltaic trackers are in an unshaded state.

Figure 3B:
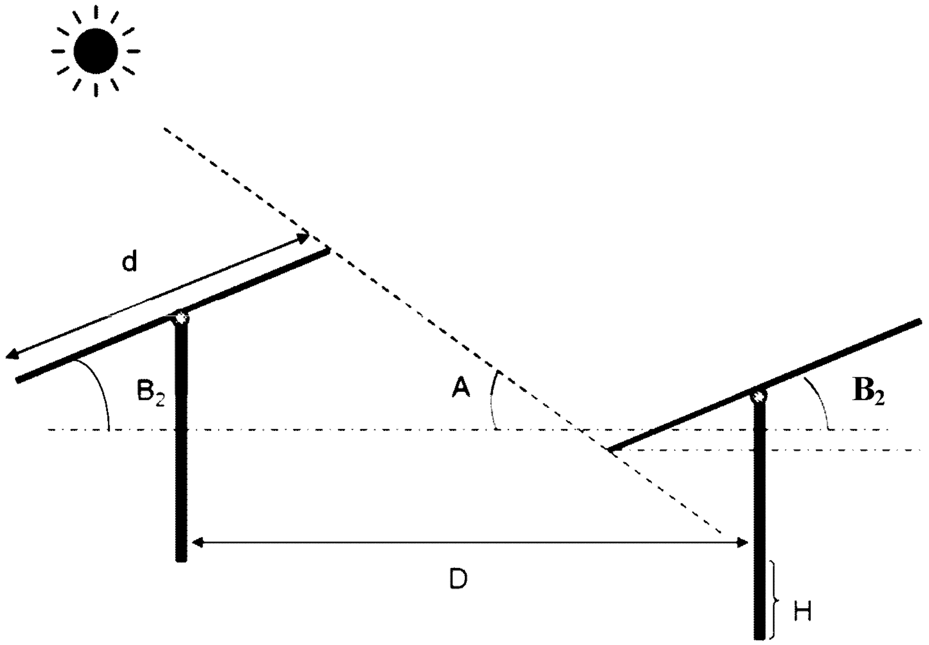
FIG. 3B is a schematic diagram of vertically adjacent photovoltaic trackers in an unshaded state according to Embodiment 3 of the present disclosure.

Exemplarily, FIG. 3B is a schematic diagram when the vertically adjacent photovoltaic trackers are in an unshaded state, where d denotes the module width, A denotes the solar incidence angle, D denotes the distance between the vertically adjacent photovoltaic trackers, $B_2$ denotes the current tracking angle of each of the vertically adjacent photovoltaic trackers, and H denotes the second height difference between the vertically adjacent photovoltaic trackers. Therefore, the second height difference H between the vertically adjacent photovoltaic trackers may be determined through the following formula:

$$d\times\sin B_2+H(D-d\times\cos B_2)\tan A$$

Alternatively, when the modules on the vertically adjacent photovoltaic trackers are in the unshaded state, at least two second candidate height differences may be determined according to the solar incidence angles, the current tracking angle and the module width of each of the vertically adjacent photovoltaic trackers, and the distance between the vertically adjacent photovoltaic trackers based on at least two days, a mean value of the at least two second candidate height differences is calculated, and the obtained mean value is used as the second height difference of the vertically adjacent photovoltaic trackers.

Exemplarily, that the module is in the unshaded state may be determined in the following manner: determining that the modules are in the unshaded state if it is identified that currents of the modules jump from a first value to a second value, wherein the first value is less than the second value; and/or determining that the modules are in the unshaded state if it is identified that a difference between the power generation of the modules on two vertically adjacent photovoltaic trackers is within a set range. The set range may be set according to an actual situation.

If it is identified in the case of relatively stable irradiance that the currents of the modules jump from the first value to the second value, that is, sudden change points of the currents of the modules, it is determined that the modules are in the unshaded state, wherein the first value is less than the second value. Alternatively, if it is identified that the difference between the power generation of the modules on two vertically adjacent photovoltaic trackers is within the set range, it is determined that the modules are in the unshaded state. For example, the power generation of the module on the photovoltaic tracker in a first row without shading is taken as a reference value, and if a difference between the power generation of the module on the photovoltaic tracker in a second row in a vertical direction of the photovoltaic tracker in the first row and the reference value is within a set range, it is determined that the modules are in the unshaded state. The set range may be set according to an actual situation.

In S350, second target tracking angles of the modules are determined according to the basic information of the at least two photovoltaic trackers, the second height difference, and historical weather data in a photovoltaic tracking scene, so that the tracking controller adjusts the corresponding photovoltaic trackers according to the second target tracking angles, so as to adjust the modules on the photovoltaic trackers.

The historical weather data in the photovoltaic tracking scene refers to typical annual weather data in the scene where the photovoltaic tracker is located, which may include hourly global horizontal irradiance (GHI) and diffuse horizontal irradiance (DHI). According to latitude and longitude of the scene where the photovoltaic tracker is located, the typical annual weather data may be exported from weather service software.

The so-called "second target tracking angle" refers to a corresponding tracking angle when overall power generation of the module on the photovoltaic tracker is optimal.

Optionally, in general, the photovoltaic trackers are mounted in an array (an array formed in horizontal and vertical directions, with the vertical direction as the column and the horizontal direction as the row). At least two photovoltaic trackers are included in one column (the vertical direction of the photovoltaic trackers). For each column of photovoltaic trackers, basic information of all the photovoltaic trackers in the column, the second height difference, and historical weather data in a scene where the photovoltaic trackers are located may be inputted to a neural network model. The neural network model automatically calculates target tracking angles of all photovoltaic trackers in the column, and then determines target tracking angles of all the photovoltaic trackers in the array. Alternatively, basic information of all the photovoltaic trackers in the array, the second height difference, and historical weather data in a scene where the photovoltaic trackers are located may be inputted to the neural network model. The neural network model automatically calculates target tracking angles of all the photovoltaic trackers in the array.

Then, the tracking controller adjusts the corresponding photovoltaic trackers according to the second target tracking angles, so as to adjust the modules on the photovoltaic trackers.

There is no sequence between S310 to S320 and S330 to S350.

According to the technical solution in the embodiments of the present disclosure, the basic information of the at least two photovoltaic trackers is determined in the back tracking phase, wherein the basic information of each of the photovoltaic trackers includes the size information and the first height difference between the two endpoints of the photovoltaic tracker, and then the second height difference between the vertically adjacent photovoltaic trackers is determined. Then, the second target tracking angles of the at least two photovoltaic trackers are determined according to the basic information of the at least two photovoltaic trackers, the second height difference, and the historical weather data in the photovoltaic tracking scene, so that the tracking controller adjusts the corresponding photovoltaic trackers according to the second target tracking angles, so as to adjust the modules on the photovoltaic trackers. According to the above technical solution, the problem of affecting the power generation due to shading of the modules on the photovoltaic trackers caused by uneven terrain in the back tracking phase is solved, and the tracking angles in the back tracking phase are adjusted, thereby increasing the power generation of the modules.

Embodiment 4

Figure 4A:
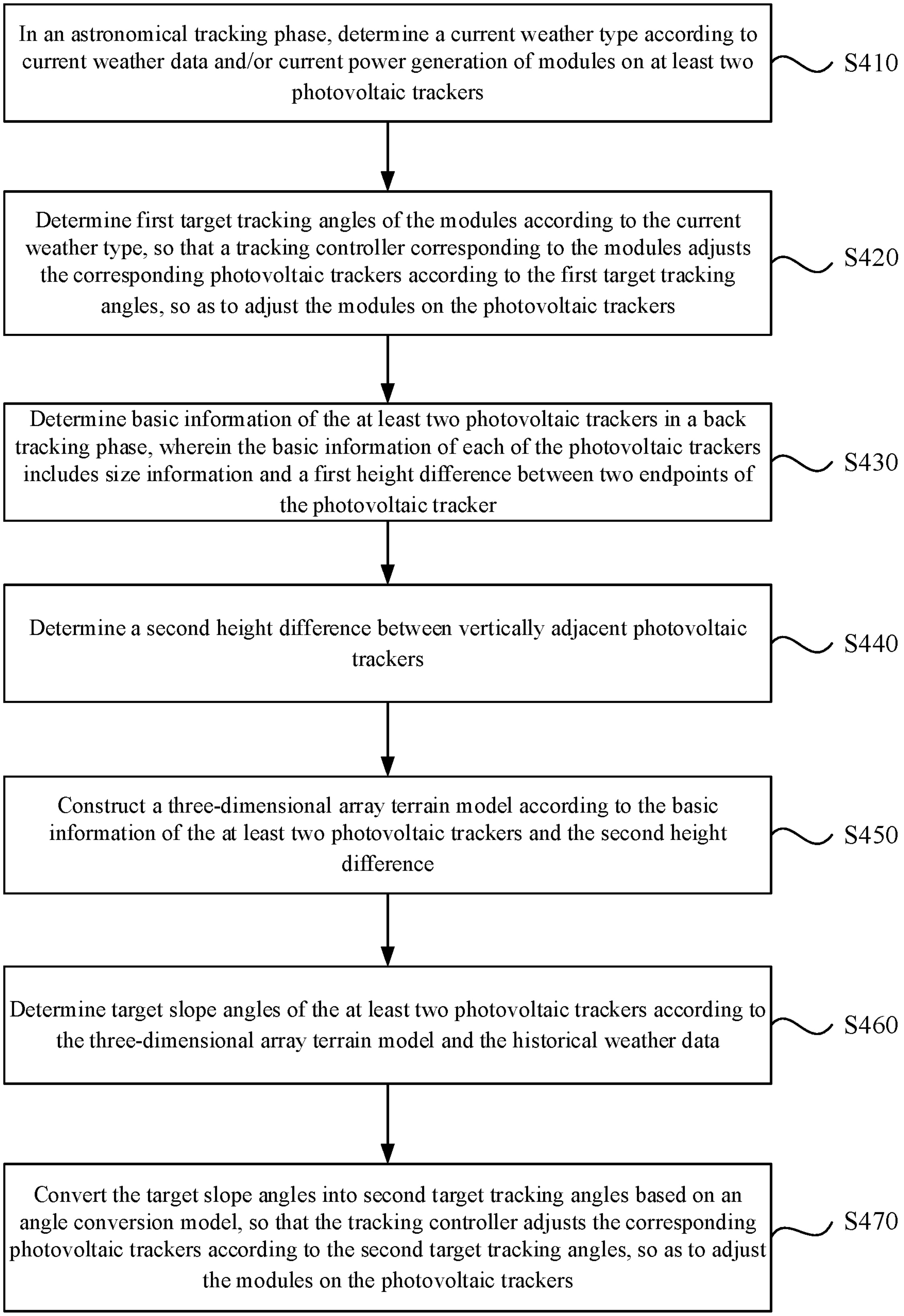
FIG. 4A is a flowchart of a tracking method according to Embodiment 4 of the present disclosure.

FIG. 4A is a flowchart of a tracking method according to Embodiment 4 of the present disclosure. Description is provided on the basis of the above embodiment, and an optional implementation solution is provided.

As shown in FIG. 4A, the method may include the following steps.

In S410, in an astronomical tracking phase, a current weather type is determined according to current weather data and/or current power generation of modules on at least two photovoltaic trackers.

In S420, first target tracking angles of the modules are determined according to the current weather type, so that a tracking controller corresponding to the modules adjusts the corresponding photovoltaic trackers according to the first target tracking angles, so as to adjust the modules on the photovoltaic trackers.

In S430, basic information of the at least two photovoltaic trackers is determined in a back tracking phase, wherein the basic information of each of the photovoltaic trackers includes size information and a first height difference between two endpoints of the photovoltaic tracker.

In S440, a second height difference between vertically adjacent photovoltaic trackers is determined.

In S450, a three-dimensional array terrain model is constructed according to the basic information of the at least two photovoltaic trackers and the second height difference.

Figure 4B:
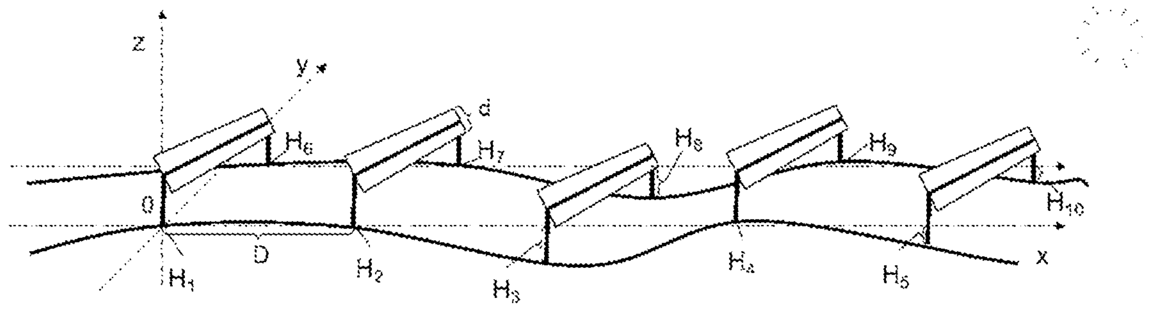
FIG. 4B is a schematic cross-sectional view of a column in a photovoltaic tracker array according to Embodiment 4 of the present disclosure.

Optionally, one photovoltaic tracker may be selected from the at least two photovoltaic trackers as a target tracker. Centered on one endpoint of the target tracker, the three-dimensional array terrain model is constructed through a spatial rectangular coordinate system according to the basic information of the at least two photovoltaic trackers and the second height difference. The three-dimensional array terrain model may further include pitches between vertically adjacent photovoltaic trackers and widths of the modules on the photovoltaic trackers. For example, FIG. 4B is a schematic cross-sectional view of a column in a photovoltaic tracker array. In FIG. 4B, $H_1$ to $H_{10}$ are height differences of a plurality of rows of trackers based on $H_1$ at a southern end of the first row of trackers, that is, horizontal height differences between photovoltaic trackers on a column. D denotes the pitch between vertically adjacent photovoltaic trackers, and d denotes the width of the module on the photovoltaic tracker.

Alternatively, centered on a middle point of the target tracker, the three-dimensional array terrain model may be constructed through the spatial rectangular coordinate system according to the basic information of the at least two photovoltaic trackers and the second height difference. Optionally, an identifier may be set for each photovoltaic tracker in the three-dimensional array terrain model, which is used to uniquely represent the photovoltaic tracker and may be in the form of numbers, letters, and a combination of numbers and letters.

In S460, target slope angles of the at least two photovoltaic trackers are determined according to the three-dimensional array terrain model and the historical weather data.

Optionally, for each column of photovoltaic trackers in the photovoltaic tracker array, the target slope angles of the at least two photovoltaic trackers are determined according to the three-dimensional array terrain model and the historical weather data, which may be implemented through the following four steps.

Firstly, for each photovoltaic tracker, the photovoltaic tracker of the at least two photovoltaic trackers that is in a vertical direction of the photovoltaic tracker is taken as an auxiliary photovoltaic tracker. For example, the photovoltaic trackers in each column are numbered from 0. If the target slope angle of the photovoltaic tracker numbered 0 is to be determined, other photovoltaic trackers in this column except for the number 0 are taken as auxiliary photovoltaic trackers; if the target slope angle of the photovoltaic tracker numbered 1 is to be determined, other photovoltaic trackers in this column except for the number 1 are taken as auxiliary photovoltaic trackers; . . . and so on.

Secondly, at least two candidate slope angles are determined. The at least two candidate slope angles may be determined with a set step size within a set slope angle range. The set slope angle range may be set according to an actual situation.

Thirdly, first theoretical power generation of the photovoltaic tracker at each of the candidate slope angles and second theoretical power generation of the auxiliary tracker at each of the candidate slope angles are determined according to the three-dimensional array terrain model and the historical weather data.

Optionally, according to a geometric relationship of preceding vertically adjacent trackers of the photovoltaic tracker to the photovoltaic tracker, a shadow shading ratio of the preceding vertically adjacent trackers of the photovoltaic tracker to the module on the photovoltaic tracker may be calculated.

Then, the first theoretical power generation of the photovoltaic tracker is determined based on the shadow shading ratio, the three-dimensional array terrain model, and the solar incidence angle. The second theoretical power generation of the auxiliary tracker at the corresponding candidate slope angle may be determined according to the method for determining the first theoretical power generation.

Fourthly, the target slope angles are determined according to the first theoretical power generation and the second theoretical power generation. Optionally, corresponding total theoretical power generation at each candidate slope angle is determined according to the first theoretical power generation and the second theoretical power generation, and then the target slope angle of the photovoltaic tracker is determined according to the corresponding total theoretical power generation at each candidate slope angle.

In S470, the target slope angles are converted into second target tracking angles based on an angle conversion model, so that the tracking controller adjusts the corresponding photovoltaic trackers according to the second target tracking angles, so as to adjust the modules on the photovoltaic trackers.

Optionally, the angle conversion model may be determined in the following manner. The angle conversion model is determined according to the solar incidence angles, a theoretical tracking angle, the target tracking angles, the pitches between the vertically adjacent photovoltaic trackers, and the widths of the modules on the photovoltaic trackers. The theoretical tracking angle refers to a tracking angle when the power generation of the modules on the photovoltaic trackers is optimal without considering the shading. For example, the angle conversion model may be determined through the following formula:

$$\cos B*d/2+(\sin B*d/2+\sin B'*d/2+D*\tan \mu)/\tan A+\cos B'*d/2=D$$

where B denotes the theoretical tracking angle, B' denotes the second target tracking angle, d denotes the width of the module on the photovoltaic tracker, D denotes the pitch between the vertically adjacent photovoltaic trackers, μ denotes the target slope angle, and A denotes the solar incidence angle. The solar incidence angle may be determined according to a solar altitude angle and a solar azimuth angle, which may be determined, for example, through the following formula: $\tan A=\tan \alpha/\sin \gamma$, where α denotes the solar altitude angle, and γ denotes the solar azimuth angle.

In this embodiment, the target slope angles are inputted into the angle conversion model to obtain the second target tracking angles based on an angle conversion model, and then the tracking controller adjusts the corresponding photovoltaic trackers according to the second target tracking angles, so as to adjust the modules on the photovoltaic trackers.

There is no sequence between S410 to S420 and S430 to S470.

According to the technical solution in the embodiments of the present disclosure, the basic information of the at least two photovoltaic trackers is determined in the back tracking phase, wherein the basic information of each of the photovoltaic trackers includes the size information and the first height difference between the two endpoints of the photovoltaic tracker, and the second height difference between vertically adjacent photovoltaic trackers is determined. Then, the three-dimensional array terrain model is constructed according to the basic information of the at least two photovoltaic trackers and the second height difference, the target slope angles of the at least two photovoltaic trackers are determined according to the three-dimensional array terrain model and the historical weather data, and the target slope angles are converted into the second target slope angles based on the angle conversion model, so that the tracking controller adjusts the corresponding photovoltaic trackers according to the second target tracking angles, so as to adjust the modules on the photovoltaic trackers. According to the above technical solution, the problem of affecting the power generation due to shading of the modules on the photovoltaic trackers caused by uneven terrain in the back tracking phase is solved, and the tracking angles in the back tracking phase is adjusted, thereby increasing the power generation of the modules.

On the basis of the above embodiments, when there is a large height difference between the vertically adjacent trackers, some trackers may be reversed, and adjustment angles of some trackers may be excessively large, resulting in greater irradiance losses. Therefore, in order to prevent the above phenomenon, as an optional solution of this embodiment, the tracking angles of the vertically adjacent trackers may be adjusted at the same time to prevent reversal of the trackers and reduce auxiliary losses. Exemplarily, the solution may be implemented through the following four steps.

Firstly, the photovoltaic trackers in the vertical direction are grouped to obtain at least two groups of vertically adjacent photovoltaic trackers, wherein two adjacent groups of vertically adjacent photovoltaic trackers include a same photovoltaic tracker. For example, if there are 10 photovoltaic trackers in the vertical direction (that is, there are 10 photovoltaic trackers in a column), which are numbered 1-10 Respectively and grouped in pairs, 9 groups of vertically adjacent photovoltaic trackers, for example, (1, 2), (2, 3), . . . , and (9, 10), may be obtained.

Secondly, a theoretical tracking angle when the modules on the at least two groups of vertically adjacent photovoltaic trackers are in an unshaded state is determined according to solar incidence angles, the basic information of the at least two photovoltaic trackers, and the second height difference. The theoretical tracking angle when the modules on the at least two groups of vertically adjacent photovoltaic trackers are in the unshaded state may be determined according to a geometric relationship among the solar incidence angles, the basic information of the at least two photovoltaic trackers, and the second height difference.

Thirdly, for each group of vertically adjacent photovoltaic trackers, a theoretical adjustment angle of the group of vertically adjacent photovoltaic trackers is determined according to a theoretical tracking angle and an actual tracking angle of the group of vertically adjacent photovoltaic trackers. The actual tracking angle refers to a tracking angle obtained according to the above method in a current scene.

Fourthly, the theoretical adjustment angles of the two adjacent groups of vertically adjacent photovoltaic trackers are compared if adjustment angles of the two adjacent groups of vertically adjacent photovoltaic trackers are different, and actual adjustment angles of the vertically adjacent photovoltaic trackers in each group are determined according to a comparison result, so that the tracking controller adjusts the corresponding photovoltaic trackers according to the actual adjustment angles.

For example, if it is determined that the adjustment angle of the photovoltaic trackers in the group (1, 2) is 5 degrees, that is, the photovoltaic trackers numbered 1 and 2 are both adjusted by 5 degrees, and the adjustment angle of the photovoltaic trackers in the group (2, 3) is 3 degrees, it is determined that an actual adjustment angle of the photovoltaic tracker numbered 2 is 5 degrees, and then an actual adjustment angle of the photovoltaic tracker numbered 3 is adaptively adjusted to ensure that the module on the photovoltaic tracker numbered 3 is not shaded by the module on the photovoltaic tracker numbered 2.

The tracking angles of the vertically adjacent photovoltaic trackers are adjusted at the same time, which can prevent excessively large adjustment angles of some photovoltaic trackers, ensure a relatively uniform overall adjustment angle of all photovoltaic trackers, and prevent a lot of irradiance losses.

Embodiment 5

Figure 5:
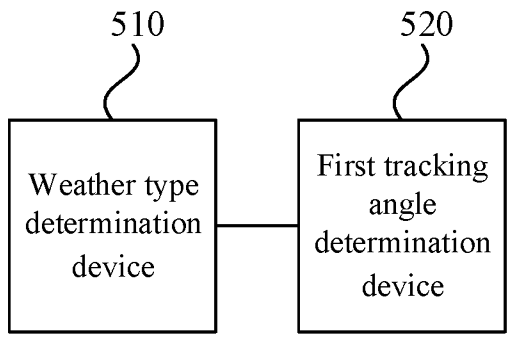
FIG. 5 is a schematic structural diagram of a tracking apparatus according to Embodiment 5 of the present disclosure.

FIG. 5 is a schematic structural diagram of a tracking apparatus according to Embodiment 5 of the present disclosure. This embodiment is applicable to a situation where a tracking angle of a photovoltaic tracker is adjusted in an astronomical tracking phase. The so-called “astronomical tracking phase” refers to a period of time during which the photovoltaic tracker rotates with the sun and a module on the photovoltaic tracker faces the sun. The apparatus may be implemented by software and/or hardware, and may be integrated into an electronic device carrying a tracking function, such as a server.

As shown in FIG. 5, the apparatus may include a weather type determination device 510 and a tracking angle determination device 520.

The weather type determination device 510 is configured to, in an astronomical tracking phase, determine a current weather type according to current weather data and/or current power generation of modules on at least two photovoltaic trackers.

The first tracking angle determination device 520 is configured to determine first target tracking angles of the modules according to the current weather type, so that a tracking controller corresponding to the modules adjusts the corresponding photovoltaic trackers according to the first target tracking angles, so as to adjust the modules on the photovoltaic trackers.

According to the technical solution in the embodiments of the present disclosure, in the astronomical tracking phase, the current weather type is determined according to the current weather data and/or the current power generation of the modules on the at least two photovoltaic trackers, and then the first target tracking angles of the modules are determined according to the current weather type, so that the tracking controller corresponding to the modules adjusts the corresponding photovoltaic trackers according to the first target tracking angles, so as to adjust the modules on the photovoltaic trackers. According to the above technical solution, identification accuracy of different weather types is improved, and the tracking angles of the photovoltaic trackers under different weather types are flexibly adjusted, thereby increasing power generation of the modules on the photovoltaic trackers and providing a new idea for intelligent photovoltaic tracking.

The weather type determination device 510 includes a first-type determination unit and a second-type determination unit.

The first-type determination unit is configured to determine, according to the current power generation of the modules, whether the current weather type belongs to a first type, wherein the first type includes Snowy and Cloudy.

The second-type determination unit is configured to determine the current weather type from a second type according to the current weather data if the current weather type does not belong to the first type, wherein the second type includes Sunny and Overcast.

The first-type determination unit includes: a power generation dispersion ratio determination subunit and a first-type determination subunit.

The power generation dispersion ratio determination subunit is configured to determine a power generation dispersion ratio according to the current power generation of the modules.

The first-type determination subunit is configured to determine that the current weather type is Snowy in the first type if the power generation dispersion ratio is equal to or greater than a first dispersion threshold.

The first-type determination subunit is further configured to determine that the current weather type is Cloudy in the first type if the power generation dispersion ratio is equal to or greater than a second dispersion threshold and a difference between cumulative power generation and reference power generation of the modules within a set time period is equal to or greater than a fluctuation threshold.

The second-type determination unit includes: a proportion determination subunit and a second-type determination subunit.

The second-type determination subunit is configured to determine a proportion of direct irradiance according to the current weather data.

The second-type determination subunit is configured to determine that the current weather type is Sunny in the second type if the proportion of direct irradiance is equal to or greater than a first threshold.

The second-type determination subunit is further configured to determine that the current weather type is Overcast in the second type if the proportion of direct irradiance is less than or equal to a second threshold, wherein the first threshold is greater than the second threshold.

The weather type determination device 510 is further configured to:

determine the current weather type according to the current power generation, a current solar altitude angle, and a dividing line between various weather types; wherein the dividing line between various weather types is determined according to a relationship among historical power generation, solar altitude angles, and historical weather data.

The apparatus further includes a basic information determination device, a second height difference determination device, and a second tracking angle determination device.

The basic information determination device is configured to determine basic information of the at least two photovoltaic trackers in a back tracking phase, wherein the basic information of each of the photovoltaic trackers includes size information and a first height difference between two endpoints of the photovoltaic tracker.

The second height difference determination device is configured to determine a second height difference between vertically adjacent photovoltaic trackers.

The second tracking angle determination device is configured to determine second target tracking angles of the modules according to the basic information of the at least two photovoltaic trackers, the second height difference, and historical weather data in a photovoltaic tracking scene, so that the tracking controller adjusts the corresponding photovoltaic trackers according to the second target tracking angles, so as to adjust the modules on the photovoltaic trackers.

The second height difference determination device is configured to:

determine, when the modules on the vertically adjacent photovoltaic trackers are in an unshaded state, the second height difference between the vertically adjacent photovoltaic trackers according to solar incidence angles, a current tracking angle and a module width of each of the vertically adjacent photovoltaic trackers, and a distance between the vertically adjacent photovoltaic trackers.

The second height difference determination device further includes an unshaded state determination unit. The unshaded state determination unit is configured to:

determine that the modules are in the unshaded state if it is identified that currents of the modules jump from a first value to a second value, wherein the first value is less than the second value; and/or determine that the modules are in the unshaded state if it is identified that the difference between the power generation of the modules on two vertically adjacent photovoltaic trackers is within the set range.

The second tracking angle determination device includes a model determination unit, a target slope angle determination unit, and a second tracking angle determination unit.

The model determination unit is configured to construct a three-dimensional array terrain model according to the basic information of the at least two photovoltaic trackers and the second height difference.

The target slope angle determination unit is configured to determine target slope angles of the at least two photovoltaic trackers according to the three-dimensional array terrain model and the historical weather data.

The second tracking angle determination unit is configured to convert the target slope angles into the second target slope angles based on an angle conversion model.

The target slope angle determination unit includes an auxiliary tracker determination subunit, a candidate slope angle determination subunit, a theoretical power generation determination subunit, and a target slope angle determination subunit.

The auxiliary tracker determination subunit is configured to take, for each photovoltaic tracker, the photovoltaic tracker of the at least two photovoltaic trackers that is in a vertical direction of the photovoltaic tracker as an auxiliary photovoltaic tracker.

The candidate slope angle determination subunit is configured to determine at least two candidate slope angles.

The theoretical power generation determination subunit is configured to determine first theoretical power generation of the photovoltaic tracker at each of the candidate slope angles and second theoretical power generation of the auxiliary tracker at each of the candidate slope angles according to the three-dimensional array terrain model and the historical weather data.

The target slope angle determination subunit is configured to determine the target slope angles according to the first theoretical power generation and the second theoretical power generation.

The apparatus further includes a grouping determination device, a theoretical tracking angle determination device, a theoretical adjustment angle determination device, and an actual adjustment angle determination device.

The grouping determination device is configured to group the photovoltaic trackers in a vertical direction to obtain at least two groups of vertically adjacent photovoltaic trackers, wherein two adjacent groups of vertically adjacent photovoltaic trackers include a same photovoltaic tracker.

The theoretical tracking angle determination device is configured to determine, according to solar incidence angles, the basic information of the at least two photovoltaic trackers, and the second height difference, a theoretical tracking angle if the modules on the at least two groups of vertically adjacent photovoltaic trackers are in an unshaded state.

The theoretical adjustment angle determination device is configured to determine, for each group of vertically adjacent photovoltaic trackers, a theoretical adjustment angle of the group of vertically adjacent photovoltaic trackers according to a theoretical tracking angle and an actual tracking angle of the group of vertically adjacent photovoltaic trackers.

The actual adjustment angle determination device is configured to compare the theoretical adjustment angles of the two adjacent groups of vertically adjacent photovoltaic trackers if adjustment angles of the two adjacent groups of vertically adjacent photovoltaic trackers are different, and determine actual adjustment angles of the vertically adjacent photovoltaic trackers in each group according to a comparison result, so that the tracking controller adjusts the corresponding photovoltaic trackers according to the actual adjustment angles.

The above tracking apparatus may perform the tracking method provided in any embodiment of the present disclosure, and has the corresponding functional modules for performing the method and effects.

Embodiment 6

Figure 6:
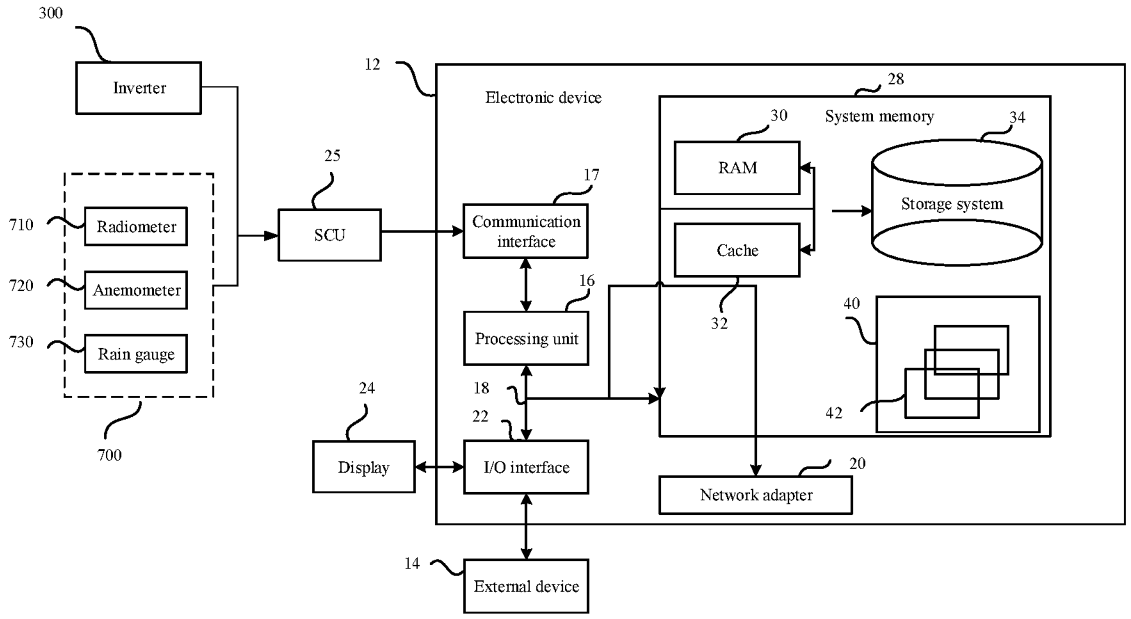
FIG. 6 is a schematic structural diagram of an electronic device according to Embodiment 6 of the present disclosure.

FIG. 6 is a schematic structural diagram of an electronic device according to Embodiment 6 of the present disclosure. FIG. 6 is a block diagram of an exemplary device configured to implement embodiments of the present disclosure. The device displayed in FIG. 6 is merely an example, and should not make any limitation on the functions and scope of use of the embodiments of the present disclosure.

As shown in FIG. 6, an electronic device 12 is implemented in the form of a general computing device. Components of the electronic device 12 may include, but are not limited to, one or more processors or processing units 16, a system memory 28, and a bus 18 that couples different system components (including the system memory 28 and the processing units 16).

The bus 18 represents one or more of several types of bus structures, including a memory bus or memory controller, a peripheral bus, an accelerated graphics port, a processor, or a local bus using any of a variety of bus architectures. For example, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The electronic device 12 includes a variety of computer system readable media. Such media may be any available media accessible to the electronic device 12, and includes volatile and non-volatile media and removable and non-removable media.

The system memory 28 may include computer system readable media in the form of a volatile memory, such as a Random Access Memory (RAM) 30 and/or a cache memory (cache 32). The electronic device 12 may include other removable/non-removable, volatile/non-volatile computer system storage media. By way of example only, a storage system 34 may be provided for reading from and writing to a non-removable, non-volatile magnetic medium (not shown in FIG. 6, typically called a "hard disk drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk (e.g., a Compact Disc Read Only Memory (CD-ROM), a digital Video Disk Read Only Memory (DVD-ROM), or other optical media) may be provided. In such cases, each drive may be connected to the bus 18 by one or more data medium interfaces. The system memory 28 may include at least one program product. The program product has a set of (e.g., at least one) program modules. The program modules are configured to perform the functions in multiple embodiments of the embodiments of the present disclosure.

A program/utility tool 40 having a set of (at least one) program modules 42 may be stored in, for example, the system memory 28. Such program modules 42 include, but are not limited to, an operating system, one or more application programs, other program modules, and program data. Each of or a combination of such examples may include an implementation of a network environment. The program modules 42 generally perform functions and/or methods in the embodiments described in the embodiments of the present disclosure.

The electronic device 12 may also communicate with one or more external devices 14 (such as a keyboard, a pointing device, and a display 24), and one or more devices that enable a user to interact with the electronic device 12, and/or any device (such as a network card or a modem) that enables the electronic device 12 to communicate with one or more other computing devices. Such communication may be performed via an input/output (I/O) interface 22. Moreover, the electronic device 12 may communicate with one or more networks (such as a Local Area Network (LAN), a general Wide Area Network (WAN), and/or a public network, e.g., the Internet) via a network adapter 20. As depicted, the network adapter 20 communicates with other modules of the electronic device 12 via the bus 18. It should be understood that, although not shown in the figures, other hardware and/or software modules can be used in conjunction with the electronic device 12, including, but not limited to, microcode, device drivers, redundant processing units, external disk drive arrays, Redundant Arrays of Independent Drives (RAID) systems, tape drives, data backup storage systems, and the like.

The electronic device may further include a communication interface 17. The communication interface 17 may also be connected to a Sensor Controller Unit (SCU) 25. The SCU 25 communicates with an inverter 300 and a data collector 700 wirelessly or via other devices. The data collector 700 includes a radiometer 710, an anemometer 720, a rain gauge 730, and the like.

The processing unit 16 executes a variety of functional applications and data processing by running programs stored in the system memory 28, such as implementing the tracking method provided in the embodiments of the present disclosure.

Embodiment 7

Embodiment 7 of the present disclosure further provides a computer-readable storage medium storing a computer program (or called computer-executable instructions). The computer program is executed by a processor to perform the tracking method provided in the embodiments of the present disclosure.

The computer storage medium in the embodiments of the present disclosure may adopt any combination of one or more computer-readable media. The computer-readable media may be a computer-readable signal medium or computer-readable storage medium. The computer-readable storage medium may be, for example but not limited to, electrical, magnetic, optical, electromagnetic, infrared, or semiconductor system, apparatus or device, or any combination thereof. The computer-readable storage media include: electrical connection with one or more wires, a portable computer disk, a hard disk, a RAM, a Read-Only Memory (ROM), an Erasable Programmable Read-Only Memory (EPROM) or a flash memory, an optical fiber, a portable CD-ROM, an optical storage device, a magnetic storage device, or any suitable combination thereof. In the text, the computer-readable storage medium may be any tangible medium that includes or stores a program. The program may be used by or used in combination with an instruction execution system, apparatus or device.

The computer-readable signal medium may include data signals propagated in a baseband or as part of carrier waves, and the computer-readable signal medium bears computer-readable program codes. Such propagated data signals can be in many forms, including but not limited to, electromagnetic signals, optical signals, or any suitable combination thereof. The computer-readable signal medium may also be any computer-readable medium other than the computer-readable storage medium, and the computer-readable medium may send, propagate or transmit the program used by or used in combination with the instruction execution system, apparatus or device.

The program codes included on the computer-readable medium may be transmitted by any suitable medium, including but not limited to, wireless, wire, optical cable, Radio Frequency (RF), and the like, or any suitable combination thereof.

The computer program codes for performing the operations in the embodiments of the present disclosure may be compiled in one or more programming languages or a combination thereof. The programming languages include object-oriented programming languages such as Java, Smalltalk, and C++, and also include conventional procedural programming languages such as a "C" language or similar programming languages. The program codes may be executed entirely on a user computer, executed partly on a user computer, executed as a standalone software package, executed partly on a user computer and partly on a remote computer, or executed entirely on a remote computer or a server. In the case of the remote computer, the remote computer may be connected to the user computer through any kind of network including a LAN or a WAN, or may be connected to an external computer (for example, connected via the Internet by using an Internet service provider).

What is claimed is:

1. A tracking method, comprising:

in an astronomical tracking phase, determining a current weather type according to at least one of current weather data, or current power generation of modules on at least two photovoltaic trackers, wherein the determining the current weather type comprises:

determining, according to the current power generation of the modules, whether the current weather type belongs to a first type, wherein the first type comprises Snowy and Cloudy; and determining the current weather type from a second type according to the current weather data in a case that the current weather type does not belong to the first type, wherein the second type comprises Sunny and Overcast;

wherein the determining, according to the current power generation of the modules, whether the current weather type belongs to the first type comprises:

determining a power generation dispersion ratio according to the current power generation of the modules;

determining that the current weather type is Snowy in the first type in a case that the power generation dispersion ratio is equal to or greater than a first dispersion threshold; and determining that the current weather type is Cloudy in the first type in a case that the power generation dispersion ratio is equal to or greater than a second dispersion threshold and a difference between cumulative power generation and reference power generation of the modules within a set time period is equal to or greater than a fluctuation threshold;

determining first target tracking angles of the modules according to the current weather type, so that a tracking controller corresponding to the modules adjusts the corresponding photovoltaic trackers according to the first target tracking angles, so as to adjust the modules on the photovoltaic trackers.

2. The method according to claim 1, wherein the determining the current weather type from the second type according to the current weather data comprises:

determining a proportion of direct irradiance according to the current weather data;

determining that the current weather type is Sunny in the second type in a case that the proportion of direct irradiance is equal to or greater than a first threshold;

determining that the current weather type is Overcast in the second type in a case that the proportion of direct irradiance is less than or equal to a second threshold, wherein the first threshold is greater than the second threshold.

3. The method according to claim 1, wherein the determining the current weather type according to the current power generation of the modules comprises:

determining the current weather type according to the current power generation, a current solar altitude angle, and a dividing line between various weather types; wherein the dividing line between the various weather types is determined according to a relationship among historical power generation, solar altitude angles, and historical weather data.

4. The method according to claim 1, further comprising:

determining basic information of the at least two photovoltaic trackers in a back tracking phase, wherein the basic information of each of the photovoltaic trackers comprises size information and a first height difference between two endpoints of the photovoltaic tracker;

determining a second height difference between vertically adjacent photovoltaic trackers;

determining second target tracking angles of the at least two photovoltaic trackers according to the basic information of the at least two photovoltaic trackers, the second height difference, and historical weather data in a photovoltaic tracking scene, so that the tracking controller adjusts the corresponding photovoltaic trackers according to the second target tracking angles, so as to adjust the modules on the photovoltaic trackers.

5. The method according to claim 4, wherein the determining the second height difference between the vertically adjacent photovoltaic trackers comprises:

determining, in a case that the modules on the vertically adjacent photovoltaic trackers are in an unshaded state, the second height difference between the vertically adjacent photovoltaic trackers according to solar incidence angles, a current tracking angle and a module width of each of the vertically adjacent photovoltaic trackers, and a distance between the vertically adjacent photovoltaic trackers.

6. The method according to claim 5, further comprising at least one of:

determining that the modules are in the unshaded state in a case of identifying that currents of the modules jump from a first value to a second value, wherein the first value is less than the second value; or determining that the modules are in the unshaded state in a case of identifying that a difference between the power generation of the modules on two vertically adjacent photovoltaic trackers is within a set range.

7. The method according to claim 4, wherein the determining the second target tracking angles of the modules according to the basic information of the at least two photovoltaic trackers, the second height difference, and the historical weather data in the photovoltaic tracking scene comprises:

constructing a three-dimensional array terrain model according to the basic information of the at least two photovoltaic trackers and the second height difference;

determining target slope angles of the at least two photovoltaic trackers according to the three-dimensional array terrain model and the historical weather data;

converting the target slope angles into the second target slope angles based on an angle conversion model.

8. The method according to claim 7, wherein the determining the target slope angles of the at least two photovoltaic trackers according to the three-dimensional array terrain model and the historical weather data comprises:

for each photovoltaic tracker, taking the photovoltaic tracker of the at least two photovoltaic trackers that is in a vertical direction of the photovoltaic tracker as an auxiliary photovoltaic tracker;

determining at least two candidate slope angles;

determining first theoretical power generation of the photovoltaic tracker at each of the candidate slope angles and second theoretical power generation of the auxiliary tracker at each of the candidate slope angles according to the three-dimensional array terrain model and the historical weather data;

determining the target slope angles according to the first theoretical power generation and the second theoretical power generation.

9. The method according to claim 4, further comprising:

grouping the photovoltaic trackers in a vertical direction to obtain at least two groups of vertically adjacent photovoltaic trackers, wherein two adjacent groups of vertically adjacent photovoltaic trackers comprise a same photovoltaic tracker;

determining, according to solar incidence angles, the basic information of the at least two photovoltaic trackers, and the second height difference, a theoretical tracking angle in a case that the modules on the at least two groups of vertically adjacent photovoltaic trackers are in an unshaded state;

for each group of vertically adjacent photovoltaic trackers, determining a theoretical adjustment angle of the group of vertically adjacent photovoltaic trackers according to a theoretical tracking angle and an actual tracking angle of the group of vertically adjacent photovoltaic trackers;

comparing the theoretical adjustment angles of the two adjacent groups of vertically adjacent photovoltaic trackers in a case that adjustment angles of the two adjacent groups of vertically adjacent photovoltaic trackers are different, and determining actual adjustment angles of the vertically adjacent photovoltaic trackers in each group according to a comparison result, so that the tracking controller adjusts the corresponding photovoltaic trackers according to the actual adjustment angles.

10. A tracking apparatus, comprising:

a weather type determination device configured to, in an astronomical tracking phase, determine a current weather type according to at least one of current weather data, or current power generation of modules on at least two photovoltaic trackers, wherein the weather type determination device comprises:

a first-type determination unit configured to determine, according to the current power generation of the modules, whether the current weather type belongs to a first type, wherein the first type comprises Snowy and Cloudy; and a second-type determination unit configured to determine the current weather type from a second type according to the current weather data in a case that the current weather type does not belong to the first type, wherein the second type comprises Sunny and Overcast;

wherein the first-type determination unit comprises:

a power generation dispersion ratio determination subunit configured to determine a power generation dispersion ratio according to the current power generation of the modules; and a first-type determination subunit configured to determine that the current weather type is Snowy in the first type in a case that the power generation dispersion ratio is equal to or greater than a first dispersion threshold, and to determine that the current weather type is Cloudy in the first type in a case that the power generation dispersion ratio is equal to or greater than a second dispersion threshold and a difference between cumulative power generation and reference power generation of the modules within a set time period is equal to or greater than a fluctuation threshold;

a first tracking angle determination device configured to determine first target tracking angles of the modules according to the current weather type, so that a tracking controller corresponding to the modules adjusts the corresponding photovoltaic trackers according to the first target tracking angles, so as to adjust the modules on the photovoltaic trackers.

11. An electronic device, comprising:

one or more processors;

a memory configured to store one or more programs;

wherein, when the one or more programs are executed by the one or more processors, the one or more processors are caused to implement the tracking method according to claim 1.

12. A non-transitory computer-readable storage medium storing a computer program, wherein, when the computer program is executed by a processor, the tracking method according to claim 1 is implemented.

* * * * *